(12) United States Patent
Luccato et al.

(10) Patent No.: US 10,530,263 B2
(45) Date of Patent: Jan. 7, 2020

(54) ELECTRONIC CONVERTER AND RELATED METHOD OF OPERATING AN ELECTRONIC CONVERTER

(71) Applicant: OSRAM GmbH, Munich (DE)

(72) Inventors: Daniele Luccato, Vittorio Veneto (IT); Enrico Raniero, Codiverno di Vigonza (IT)

(73) Assignee: OSRAM GMBH, Munich (DE)

( * ) Notice: Subject to any disclaimer, the term of this patent is extended or adjusted under 35 U.S.C. 154(b) by 30 days.

(21) Appl. No.: 15/769,775

(22) PCT Filed: Oct. 20, 2016

(86) PCT No.: PCT/IB2016/056307
§ 371 (c)(1),
(2) Date: Apr. 20, 2018

(87) PCT Pub. No.: WO2017/068521
PCT Pub. Date: Apr. 27, 2017

(65) Prior Publication Data
US 2018/0309375 A1 Oct. 25, 2018

(30) Foreign Application Priority Data
Oct. 23, 2015 (IT) .......................... 102015000065013

(51) Int. Cl.
*H02M 3/335* (2006.01)
*H02M 3/337* (2006.01)
(Continued)

(52) U.S. Cl.
CPC ....... *H02M 3/33576* (2013.01); *H02M 3/337* (2013.01); *H02M 3/33507* (2013.01);
(Continued)

(58) Field of Classification Search
CPC ............. H02M 3/335; H02M 3/33507; H02M 3/33515; H02M 3/33523; H02M 3/3353;
(Continued)

(56) References Cited

U.S. PATENT DOCUMENTS 5,325,283 A    6/1994  Farrington et al.
5,684,688 A    11/1997 Rouaud et al.
(Continued)

FOREIGN PATENT DOCUMENTS

JP    2015061342 A  *  3/2015  .............. H02M 3/28
WO   2015044846 A2    4/2015

OTHER PUBLICATIONS

International Search Report based on application No. PCT/IB2016/056307 (12 pages) dated Jan. 30, 2017 (for reference purpose only).
(Continued)

*Primary Examiner* — Gary L Laxton
*Assistant Examiner* — Ivan Laboy
(74) *Attorney, Agent, or Firm* — Viering Jentschura & Partner MBB

(57) ABSTRACT

An electronic converter comprising an input comprising two terminals for receiving a first power signal, and an output comprising two terminals for providing a second power signal. On the primary side, the converter comprises a half-bridge, a transformer and a first capacitor. Specifically, the first capacitor and the primary winding of the transformer are connected in series between the intermediate point of the half-bridge and an input terminal. On the secondary side, the converter comprises a diode, a second capacitor and an inductor. The second capacitor and the secondary winding of the transformer are connected in series between the cathode and anode of the diode, and the inductor and the output are connected in series between the cathode and the anode of the diode. The electronic converter
(Continued)

comprises a third capacitor and at least one electronic switch adapted to selectively connect the third capacitor in parallel with the second capacitor.

6 Claims, 12 Drawing Sheets

(51) Int. Cl.
*H02M 1/00* (2006.01)
*H02M 7/48* (2007.01)

(52) U.S. Cl.
CPC .......... *H02M 3/33538* (2013.01); *H02M 2001/0058* (2013.01); *H02M 2007/4815* (2013.01); *H02M 2007/4818* (2013.01); *Y02B 70/1433* (2013.01); *Y02B 70/1491* (2013.01)

(58) Field of Classification Search
CPC ........ H02M 3/33538; H02M 3/33546; H02M 3/33553; H02M 3/33569; H02M 3/33576; H02M 3/33592; H02M 3/337; H02M 3/3376; H02M 2001/0048; H02M 2001/0054; H02M 2001/0058; H02M 7/4826; H02M 2007/4815; H02M 2007/4818; Y02B 70/14; Y02B 70/1416; Y02B 70/1433; Y02B 70/1441; Y02B 70/145; Y02B 70/1491
See application file for complete search history.

(56) References Cited

U.S. PATENT DOCUMENTS

| | | | |
|---|---|---|---|
| 5,757,626 A | 5/1998 | Jovanovic et al. | |
| 5,790,389 A | 8/1998 | Hua | |
| 6,272,027 B1 | 8/2001 | Fraidlin et al. | |
| 2006/0227576 A1* | 10/2006 | Yasumura | H02M 3/335 363/21.02 |
| 2007/0230228 A1 | 10/2007 | Mao | |
| 2010/0165669 A1 | 7/2010 | Li | |
| 2010/0208499 A1 | 8/2010 | Halberstadt | |
| 2010/0259241 A1* | 10/2010 | Cuk | H02M 3/005 323/311 |
| 2012/0224396 A1* | 9/2012 | Nozaki | H02M 3/3378 363/17 |
| 2012/0230059 A1 | 9/2012 | Adragna et al. | |
| 2012/0250382 A1* | 10/2012 | Frattini | H02M 3/33569 363/126 |
| 2012/0300501 A1* | 11/2012 | Kojima | H02M 3/33576 363/17 |
| 2014/0092643 A1 | 4/2014 | Luccato | |
| 2014/0225439 A1* | 8/2014 | Mao | H02M 3/3376 307/31 |
| 2015/0085534 A1* | 3/2015 | Abramovitz | H02M 1/34 363/21.01 |
| 2015/0091448 A1* | 4/2015 | Kato | H02M 3/33507 315/158 |
| 2015/0124487 A1 | 5/2015 | Fu et al. | |
| 2015/0263629 A1* | 9/2015 | Stuler | H02M 3/33546 363/21.02 |
| 2017/0085186 A1* | 3/2017 | Ramabhadran | H02M 3/33546 |
| 2017/0170735 A1* | 6/2017 | Yang | H02M 1/14 |
| 2017/0331379 A1* | 11/2017 | Mao | H02M 3/3376 |

OTHER PUBLICATIONS

Bor-Ren Lin and Fang-Yu Hsieh; Soft-Switching Zeta-Flyback Converter with a Buck-Boost Type of Active Clamp; IEEE vol. 54 No. Oct. 5, 2007.
U.S. ExParte Quayle Office Action based on U.S. Appl. No. 15/024,360 (9 pages) dated Apr. 6, 2017 (for reference purpose only).
U.S. Notice of Allowance based on U.S. Appl. No. 15/024,360 (6 pages) dated Jul. 28, 2017 (for reference purpose only).
Tsai-Fu et al.: "Design optimization for asymmetrical ZVS-PWM zeta converter"; IEEE Transactions on Aerospace and Electronic Systems; Apr. 1, 2003; pp. 521-532.
Huai Wei et al.: "Comparison of basic converter topologies for power factor correction" Southeastcon '98; Apr. 24, 1998; pp. 348-353.
International Search Report based on application No. PCT/IB2014/064657 (6 pages) dated Mar. 20, 2015 (for reference purpose only).

* cited by examiner

ELECTRONIC CONVERTER AND RELATED METHOD OF OPERATING AN ELECTRONIC CONVERTER

CROSS-REFERENCE TO RELATED APPLICATION

The present application is a national stage entry according to 35 U.S.C. § 371 of PCT application No.: PCT/IB2016/056307 filed on Oct. 20, 2016, which claims priority from Italian Patent Application Serial No.: 102015000065013 which was filed Oct. 23, 2015, and is incorporated herein by reference in its entirety and for all purposes.

TECHNICAL FIELD

The description relates to electronic converters.

BACKGROUND

Electronic converters for light sources comprising e.g. at least one LED (Light Emitting Diode) or other solid-state lighting means, may offer a direct current output. Such current may be steady or vary in time, e.g. in order to adjust the brightness emitted by the light source (so-called dimming function).

FIG. 1 shows a possible lighting arrangement comprising an electronic converter 10 and a lighting module 20 including, e.g., at least one LED L.

For instance, FIG. 2 shows an example of a lighting module 20 comprising e.g. a LED chain, i.e. a plurality of LEDs connected in series. As an example, FIG. 2 shows four LEDs $L_1$, $L_2$, $L_3$ and $L_4$.

Electronic converter 10 usually comprises a control circuit 102 and a power circuit 12 (e.g. an AC/DC or DC/DC switching supply) which receives at an input a power signal (e.g. from the mains) and provides at an output, via a power output 106, a direct current. Such a current may be steady or vary in time. E.g., control circuit 102 may set, via a reference channel $I_{ref}$ of power circuit 12, the current required by LED module 20.

For example, such a reference channel $I_{ref}$ may be used for adjusting the brightness of the light emitted by lighting module 20. As a matter of fact, in general terms, a regulation of the light brightness emitted by LED module 20 may be achieved by regulating the average current flowing through the lighting module, for example by setting a lower reference current $I_{ref}$ or by switching on or off power circuit 12 through a Pulse Width Modulation (PWM) signal, typically at a frequency of 100 to 500 Hz.

Generally speaking, there are many types of electronic converters, which are mainly divided into insulated and non-insulated converters. For example, among the non-insulated electronic converters we may name "buck", "boost", "buck-boost", "Cuk", "SEPIC" and "ZETA" converters. Insulated converters are e.g. "flyback", "forward" converters.

For example, FIG. 3 shows a circuit diagram of a half-bridge converter 12 operating as a DC/DC converter. An input AC current may be converted into a direct current via a rectifier, e.g. a diode-bridge rectifier, and optionally a filter capacitor.

In the presently considered example, converter 12 receives at input, via two input terminals $110/GND_1$, a voltage $V_{in}$ and provides at output, via two output terminals 106, a regulated voltage $V_o$ or preferably a regulated current $i_o$.

In the presently considered example, a load $R_O$ is connected with said output 106, and it may consist in the previously described lighting module 20.

Converter 12 moreover includes a half-bridge, i.e. two electronic switches $S_1$ and $S_2$ which are connected (typically directly) in series between both input terminals $110/GND_1$, wherein the switching of electronic switches $S_1$ and $S_2$ is driven by a control unit 112. For example, in the embodiment such electronic switches $S_1$ and $S_2$ are N-MOS transistors or n-channel MOSFETs (Metal-Oxide-Semiconductor Field-Effect Transistors). Such switches $S_1$ and $S_2$ may have respective capacitances $C_{A1}$, $C_{A2}$ and respective diodes $D_{A1}$, $D_{A2}$ connected therewith in parallel.

Typically, control unit 112 is configured for switching switches $S_1$ and $S_2$ alternatively, i.e. only one of both switches $S_1$ and $S_2$ is closed at a given time. Generally speaking, there may be also provided intermediate intervals during which neither switch $S_1$ or $S_2$ is closed. For this reason, control unit 112 is typically configured for driving switches $S_1$ and $S_2$ of half bridge $S_1/S_2$ with the following phases, which are repeated periodically:

during a first time interval $\Delta t1$ switch $S_1$ is closed and switch $S_2$ is opened;

during a second time interval $\Delta t2$ switch $S_1$ is opened and switch $S_2$ is opened;

during a third time interval $\Delta t3$ switch $S_1$ is opened and switch $S_2$ is closed;

during a fourth time interval $\Delta t4$ switch $S_1$ is opened and switch $S_2$ is opened.

In the presently considered example, converter 12 moreover comprises a transformer T including a primary winding T1 and a secondary winding T2. Specifically, transformer T may be modelled as an ideal transformer having a given ratio of the number of turns 1:n, an inductor $L_M$ which represents the magnetising induction of transformer T, and an inductor $L_R$ which represents the leakage inductance, which are shown in FIG. 3 on the primary side of transformer T.

In the presently considered example, primary winding T1 of transformer T and at least one capacitor $C_{RP}$ are connected in series between the intermediate point between both switches $S_1$ and $S_2$ and the first input terminal 110 (positive terminal) and/or the second input terminal $GND_1$ (a negative terminal representing a first ground). Specifically, in the presently considered example, the first terminal of primary winding T1 of transformer T is connected (e.g. directly) to the intermediate point between both electronic switches $S_1$ and $S_2$. On the other hand, the second terminal of primary winding T1 of transformer T is connected, via at least one capacitor $C_{RP}$, to the first input terminal 110 and/or to ground GND. Therefore, switches $S_1$ and $S_2$ may be used for selectively connecting the first terminal of primary winding T1 of transformer T to voltage $V_{in}$ or to ground $GND_1$, thereby controlling the current flowing through primary winding T1 of transformer T.

On the secondary side T2 of transformer T, converter 12 comprises a rectifying circuit configured for converting the alternated current (AC) supplied by secondary winding T2 into a direct current (DC), and a filter circuit stabilizing the signal supplied by the rectifying circuit, so that output voltage $V_o$ and/or output current $i_o$ are more stable.

Specifically, in the presently considered example, the converter comprises, on the secondary side of transformer T, three branches which are connected in parallel, wherein:

a) the first branch comprises a first capacitor $C_{RS}$ connected in series with secondary winding T2 of transformer T, b) a second branch, comprising a diode D, and c) a third branch, comprising a second capacitor $C_o$ connected in series with an inductor $L_o$, wherein output 106 is connected in parallel with second capacitor $C_o$.

For example, a first terminal of secondary winding T2 may be connected (e.g. directly) to the cathode of diode D, and the second terminal of secondary winding T2 is connected (e.g. directly) via capacitor $C_{RS}$ to the anode of diode D. Moreover, a first terminal of inductor $L_o$ may be connected (e.g. directly) to the cathode of diode D, and the second terminal of inductor $L_o$ may be connected (e.g. directly) via capacitor $C_o$ to the anode of diode D (which therefore represents a second ground $GND_2$). The converter is asymmetrical because the on-times of $S_1$ and $S_2$ are typically different and mainly depend on the output voltage.

The converter shown in FIG. 3 offers the advantage that such a converter may be driven so that switches $S_1$ and $S_2$ are switched at zero voltage (Zero Voltage Switching, ZVS) and diode D is switched at zero current (Zero Current Switching, ZCS), achieving a so-called soft switching. Substantially, the ZVS and ZCS conditions may be achieved by correctly sizing the resonant components of the converter (i.e. inductances and capacitances).

Specifically, as previously stated, there are typically provided intermediate switching intervals, wherein neither switch $S_1$ or $S_2$ is closed. During such time intervals, the current on primary side of transformer T1 should charge and discharge capacitances $C_{A1}$ and $C_{A2}$ associated with switches $S_1$ and $S_2$, so that switches $S_1$ and $S_2$ may be closed in the following phase of zero voltage switching.

For example, details about the operation and the possible sizing of the circuit shown in FIG. 3 are described in document PCT/IB2014/064657, which is herein incorporated by reference in its entirety and for all purposes.

However, when the converter is used for driving a LED chain, or when the converter is used as a current generator (i.e. with current control), output voltage $V_o$ depends on the number of LEDs L which are connected in series, i.e. voltage $V_o$ should substantially correspond to the sum of the forward voltages of LEDs L. Therefore, the converter should be able to supply different output voltages, in order to support a variable number of LEDs. For example, the ratio between the minimum and maximum voltage capability is normally required to amount to three. Moreover, control unit 112 is often configured for regulating the supplied current $i_o$ to a desired value, which may also be variable (see $I_{ref}$ in FIGS. 1 and 3), e.g. for implementing a dimming function.

Therefore, converter 12 should be sized so that it may handle various operating conditions, specifically as regards voltage and current variations.

However, this often implies that the converter is no longer able to guarantee a zero voltage switching of switches $S_1$ and $S_2$ and/or a zero current switching of diode D for all operating conditions.

Specifically, transformer T (magnetizing inductance $L_M$ and optional inductors connected in parallel with the primary and/or secondary windings) is typically sized in such a way as to ensure a correct ZVS for switches $S_1/S_2$ and a correct ZCS for diode D, and simultaneously to achieve a desired efficiency in all operating conditions.

In this case, current $I_P$ flowing through primary side T1 of transformer T charges and discharges capacitors $C_{A1}$ and $C_{A2}$, when neither switch $S_1$ or $S_2$ is closed, thereby creating the ZVS condition for switches $S_1$ and $S_2$.

The other components are sized in such a way as to ensure a correct resonance condition within the switching cycle.

In this situation, the inventors have observed that at low output voltages the ratio between the on-times of $S_1$ to $S_2$ reaches the lowest values. Specifically, the on-time of switch $S_2$ must be sufficiently long as to subsequently enable the ZVS condition for closing switch $S_1$, because the current flowing through switch $S_2$ should become positive.

However, in this case the current flowing through diode D shows a higher oscillation. In this case, therefore, the opening of switch $S_2$ may cause the loss of the ZCS condition on diode D.

SUMMARY

The present description aims at providing solutions adapted to overcome one or more of the previously outlined drawbacks.

According to various embodiments, said object is achieved thanks to an electronic converter having the features set forth in the claims that follow. The embodiments also refer to a related method of operating an electronic half-bridge converter.

The claims are an integral part of the technical teaching provided herein with reference to the invention.

As previously stated, the present description relates to an electronic converter adapted to operate with different operating conditions, i.e. with different required output currents and voltages.

Specifically, the inventors have observed that the operating interval of an electronic converter may be improved through an electronic converter which may adapt the values of the equivalent resonant components as a function of the operating conditions thereof (i.e. the required output current and/or voltage).

In various embodiments, the electronic converter comprises an input with two terminals, for receiving a first power signal, and an output with two terminals, for providing a second power signal.

In various embodiments, the converter comprises a half-bridge including two electronic switches connected in series between both input terminals, and a transformer including a primary winding and a secondary winding. In various embodiments, the first capacitor and the primary winding are connected in series between the intermediate point of the half-bridge and at least one of both input terminals.

In various embodiments, the converter comprises, on the secondary side, three branches which are connected in parallel. Specifically, the first branch comprises a diode. The second branch comprises a second capacitor, wherein the second capacitor and the secondary winding are connected in series between the cathode and the anode of the diode. The third branch comprises and inductor and the output connected in series between the cathode and the anode of the diode. Preferably, a third capacitor is connected in parallel with the output. Such third capacitor is optional and may be used e.g. in case of a resistive load in order to keep output voltage constant, but in the case of a LED load the voltage of the load is constrained by the LED voltage itself, and therefore the capacitor may be omitted.

In various embodiments, the electronic converter also comprises a fourth capacitor and at least one electronic switch, adapted to selectively connect the fourth capacitor in parallel with the second capacitor, thereby varying the resonance period of the electronic converter.

For example, in various embodiments, it is possible to resort to a third electronic switch, such as e.g. a diode, which is closed when the voltage across the fourth capacitor exceeds the voltage across the second capacitor. The converter may also comprise a fourth electronic switch, such as e.g. a diode, which is closed when voltage across the second capacitor exceeds the sum of the voltage across the fourth capacitor and the output voltage, i.e. the voltage at the third capacitor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings in which.

DETAILED DESCRIPTION

In the following description, numerous specific details are given to provide a thorough understanding of the embodiments. The embodiments can be practiced without one or more of the specific details, or with other methods, components, materials, etc. In other instances, well-known structures, materials, or operations are not shown or described in detail to avoid obscuring various aspects of the embodiments.

Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments.

The headings provided herein are for convenience only and therefore do not interpret the extent of protection or scope of the embodiments.

Figure 1:
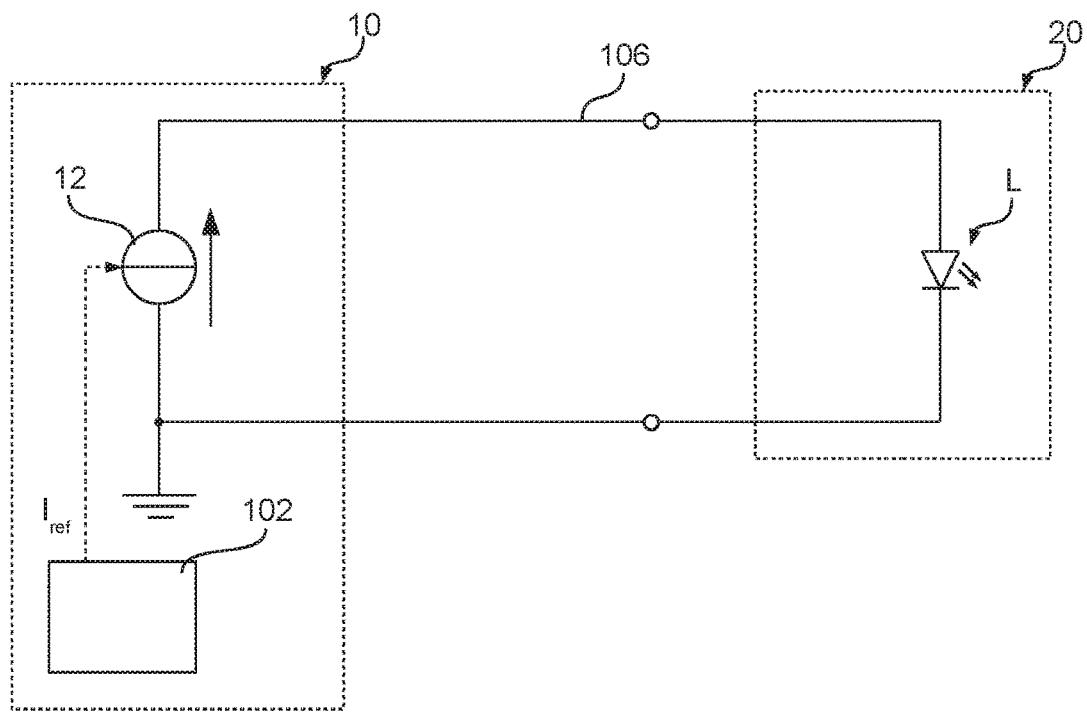
FIGS. 1 to 3 have already been described in the foregoing.
Figure 2:
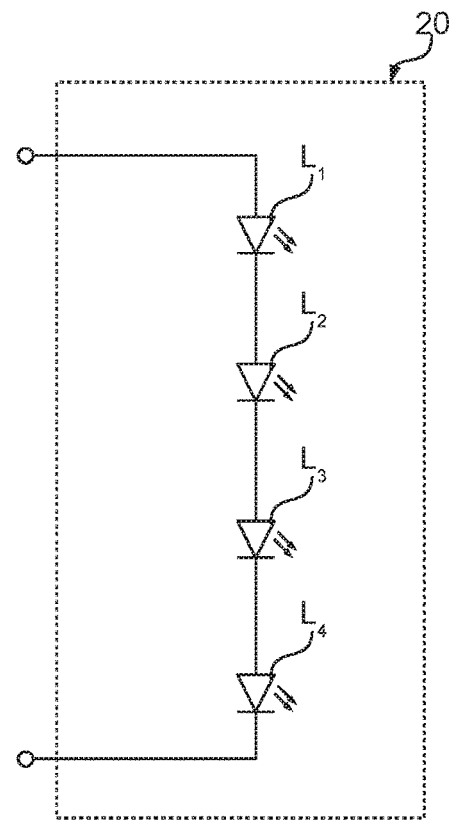
Figure 3:
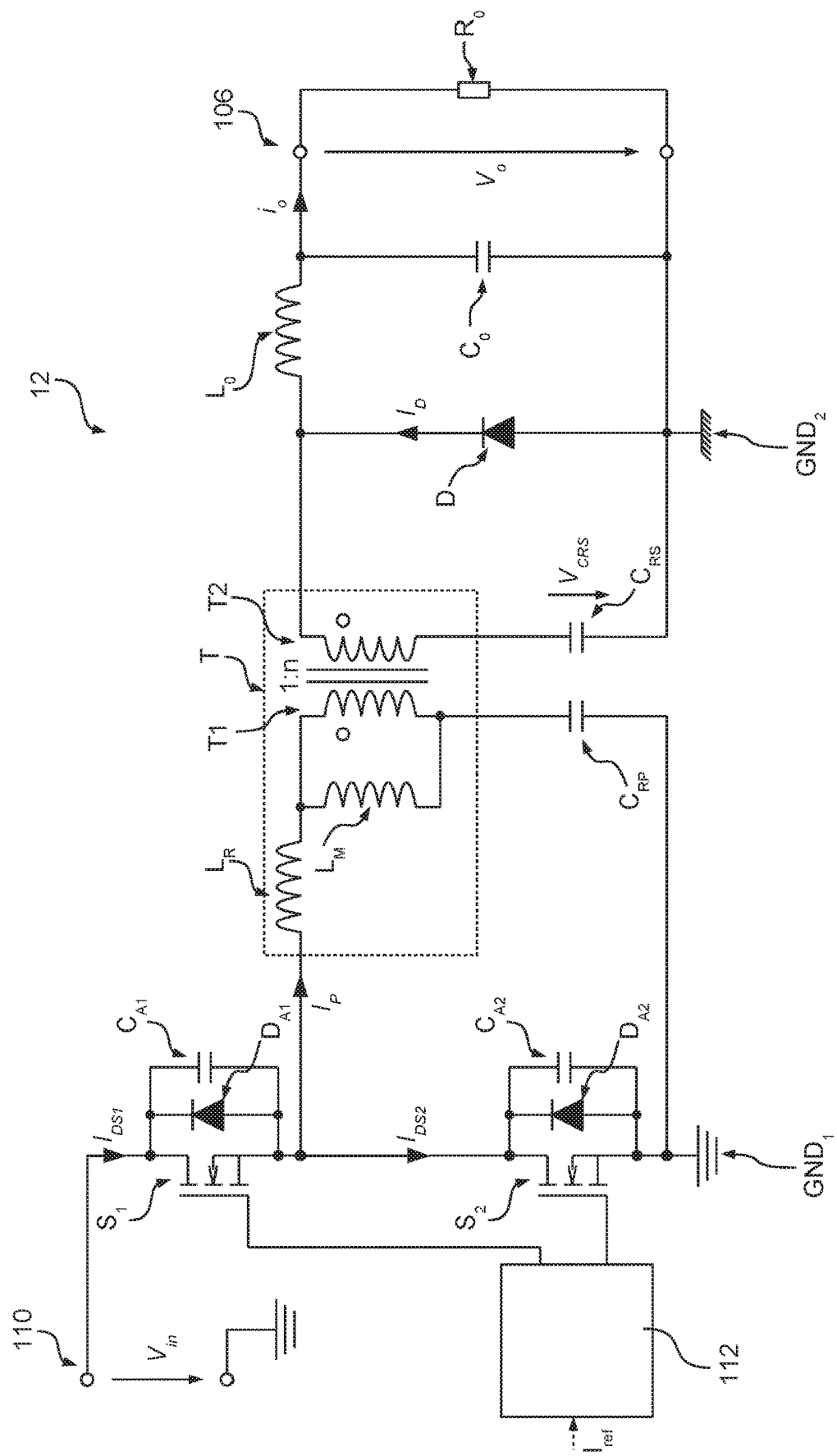

In the following FIGS. 4 to 10, the parts, elements or components which have already been described with reference to FIGS. 1 to 3 are denoted with the same references previously used in such Figures; the description of such previously described elements will not be repeated in the following, so as not to overburden the present detailed description.

As mentioned in the foregoing, the present description relates to an electronic converter 12 adapted to operate in different operating conditions, i.e. with different output currents and voltages.

Specifically, the inventors have observed that the operating range of an electronic converter may be improved through an electronic converter adapted to adjust the values of the equivalent resonant components as a function of the operating conditions thereof (i.e. output current and/or voltage).

Figure 4:
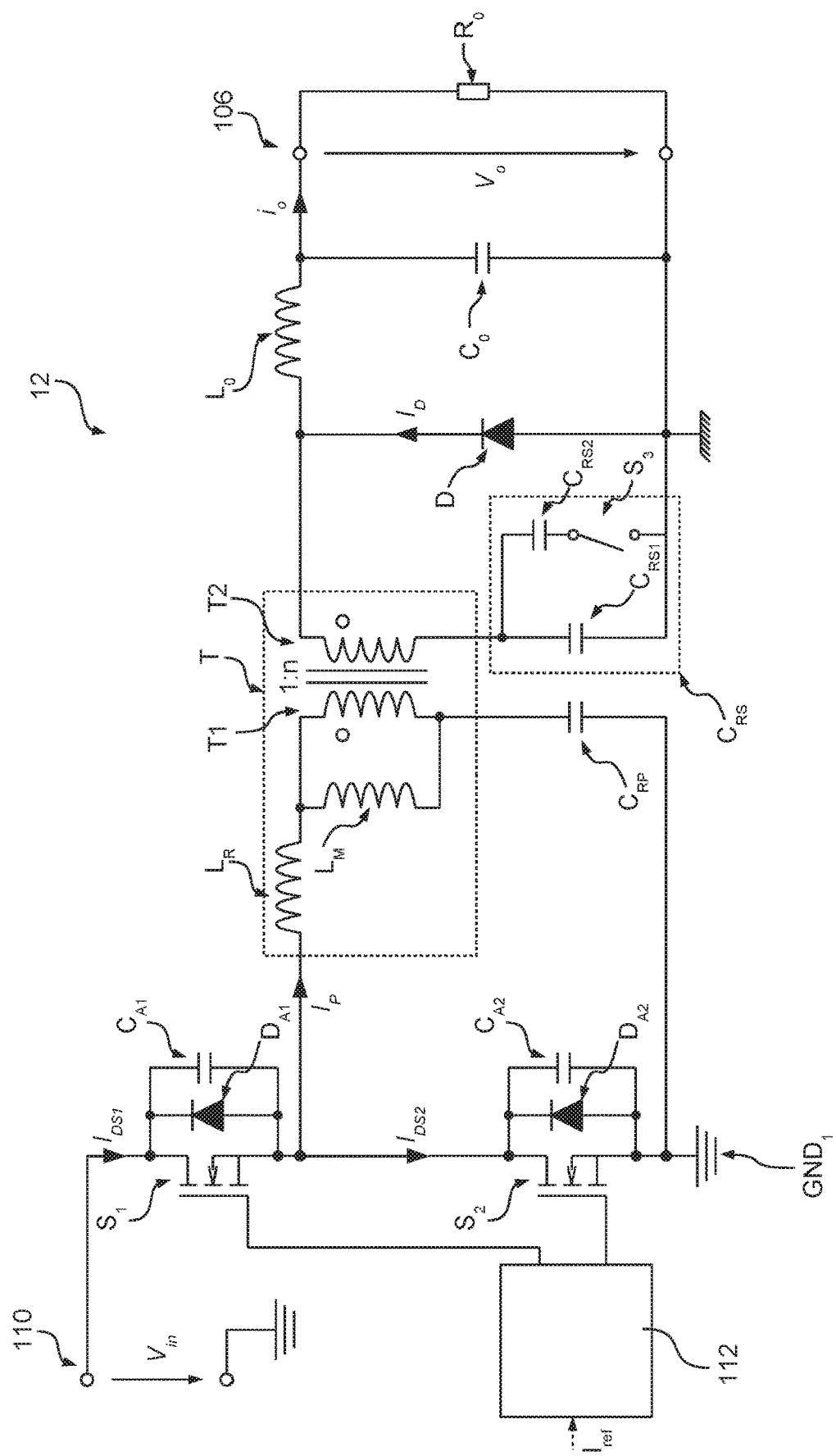
FIG. 4 shows a first embodiment of an electronic converter adapted to adjust its resonant components.

FIG. 4 shows a first embodiment of an electronic converter 12 according to the present description, which is substantially based on the circuit diagram shown in FIG. 3.

In this case, as well, converter 12 receives at input, via two input terminals 110/GND$_1$, a voltage V$_{in}$, and provides at output, via two output terminals 106, a regulated voltage V$_o$ or preferably a regulated current i$_o$.

In the presently considered embodiment, a load R$_0$ is connected to said output 106, which may be e.g. the lighting module 20 described with reference to FIGS. 1 and 2.

Converter 12 moreover comprises a half-bridge, i.e. two electronic switches S$_1$ and S$_2$ which are connected in series between both input terminals 110/GND$_1$, wherein the switching of electronic switches S$_1$ and S$_2$ is driven by a control unit 112. For example, control unit 112 may be an analogue and/or a digital circuit, e.g. a micro-processor which is programmed via a software code. For example, in various embodiments, control unit 112 is configured for driving switches as a function of output current i$_o$, e.g. in order to regulate output current i$_o$ to a desired (average) value, e.g. I$_{ref}$, provided by circuit 102.

In various embodiments, electronic switches S$_1$ and S$_2$ are N-MOS transistors, in particular n-channel MOSFETs (Metal-Oxide-Semiconductor Field-Effect Transistors). Such switches S$_1$ and S$_2$ may have respective capacitances C$_{A1}$, C$_{A2}$ and respective diodes D$_{A1}$, D$_{A2}$ connected in parallel therewith. For example, capacitances C$_{A1}$ and C$_{A2}$ may represent the intrinsic capacitances of a MOSFET, and/or may be implemented via additional capacitors, which are connected in parallel with switches S$_1$ and S$_2$. On the other hand, diodes D$_{A1}$ and D$_{A2}$ may represent the body diodes of a MOSFET, and/or may be implemented via additional diodes.

In the presently considered embodiment, converter 12 moreover comprises a transformer T, including a primary winding T1 and a secondary winding T2. Specifically, transformer T may be modelled as an ideal transformer having a given ratio of the number of turns 1:n, an inductor L$_M$ which represents the magnetising induction of transformer T, an inductor L$_{R2}$ which represents the leakage inductance, which are mounted on the primary side of transformer T. Generally speaking, converter 12 may also comprise other inductors, which are connected in series and/or in parallel with primary winding T1 and/or secondary winding T2 of transformer T.

Specifically, primary winding T1 of transformer T and at least one capacitor C$_{RP}$ are connected in series between the intermediate point between both electronic switches S$_1$ and S$_2$ and the first output terminal 110 and/or the second input terminal, which represents a first ground GND$_1$. Specifically, in the presently considered embodiment, the first terminal of primary winding T1 of transformer T is connected (e.g. directly) to the intermediate point between both electronic switches S$_1$ and S$_2$. On the contrary, the second terminal of primary winding T1 of transformer T is connected through at least one capacitor C$_{RP}$ to the first input terminal and/or to ground GND. Therefore, switches S$_1$ and S$_2$ may be used for selectively connecting the first terminal of primary winding T1 of transformer T to voltage V$_{in}$ or to ground GND$_1$.

On the secondary side, the converter comprises three branches which are connected (preferably directly) in parallel, wherein
a) the first branch comprises a first capacitor C$_{RS}$ connected in series with secondary winding T2 of transformer T,
b) a second branch comprising diode D, and c) a third branch comprising an inductor $L_o$ connected in series with output 106/$GND_2$.

In various embodiments, a second capacitor $C_o$ may be connected in parallel with output 106/$GND_2$. Such a capacitor is optional and may be used, for example, in the case of a resistive load, in order to keep output voltage constant, but in the case of a LED load the voltage of the load is constrained by the LED voltage itself, and therefore the capacitor may be omitted.

Specifically, in the presently considered example, a first terminal of secondary winding T2 is connected (e.g. directly) to the cathode of diode D, and the second terminal of secondary winding T2 is connected (e.g. directly) via capacitor $C_{RS}$ to the anode of diode D. Moreover, a first terminal of inductor $L_o$ is connected (e.g. directly) to the cathode of diode D, and the second terminal of inductor $L_o$ is connected (e.g. directly) to the positive terminal of the output, and the negative terminal of the output may be connected (e.g. directly) to the anode of diode D.

As previously stated, typically the converter is sized so that it exhibits a desired efficiency at high output voltages, while ensuring the ZVS condition for $S_1/S_2$ and the ZCS condition for diode D also at low output voltages.

However, in the case of low output voltages, the ZCS condition for the output diode may be lost, because the on-time of switch $S_2$ may be too long, therefore causing a higher oscillation in the current flowing through diode D. Specifically, as described in document PCT/IB2014/064657, such an oscillation is influenced (inter alia) also by the value of capacitance $C_{RS}$ connected in series with secondary winding T2.

Specifically, such additional oscillation is generated also when the value of capacitor $C_{RS}$ is too low for the specific operating condition. Therefore, this phenomenon may be avoided, e.g., by varying the capacitance of capacitor $C_{RS}$ as a function of the operating condition of converter 12.

For example, as shown in FIG. 4, in an embodiment a main capacitor $C_{RS1}$ may be used for high output voltages, and a further capacitor $C_{RS2}$ may be connected, e.g. via an electronic switch $S_3$, such as an n-channel MOSFET, in parallel with the first capacitor $C_{RS1}$, so that the value of equivalent capacitance $C_{RS}$ may be increased, thereby increasing in turn the oscillation period.

For example, in various embodiments, control circuit 112 may monitor the duration of the time interval during which switch $S_2$ is closed, and may drive switch $S_3$ in such a way as to increase the value of capacitance $C_{RS}$ if such duration exceeds a predetermined threshold. For example, switch $S_3$ may be closed for low values of the output voltage, which is linked to the ratio of the durations S1 to S2. As a matter of fact, in the presence of a low output voltage, the duration of $S_2$ becomes longer, so that if capacitor $C_{RS2}$ were not present a higher oscillation would be generated, with a consequent loss of the ZCS condition for diode D.

Figure 5A:
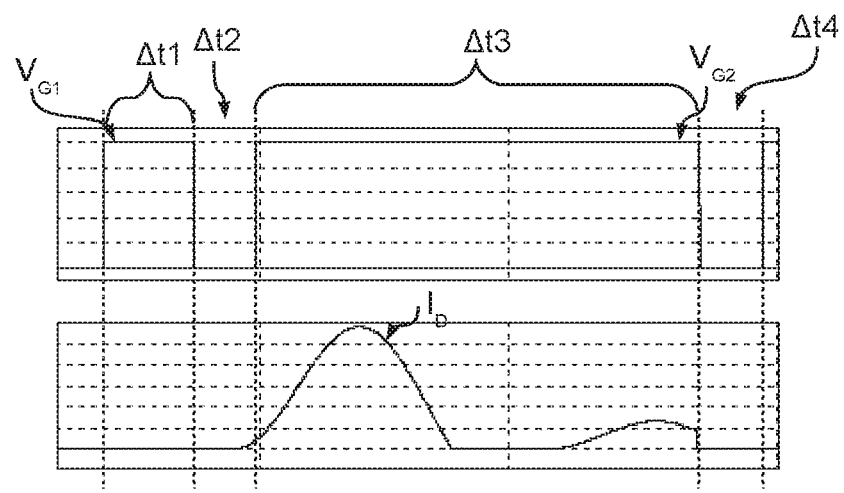
FIGS. 5A and 5B show details of the operation of the converter in FIG. 4.
Figure 5B:
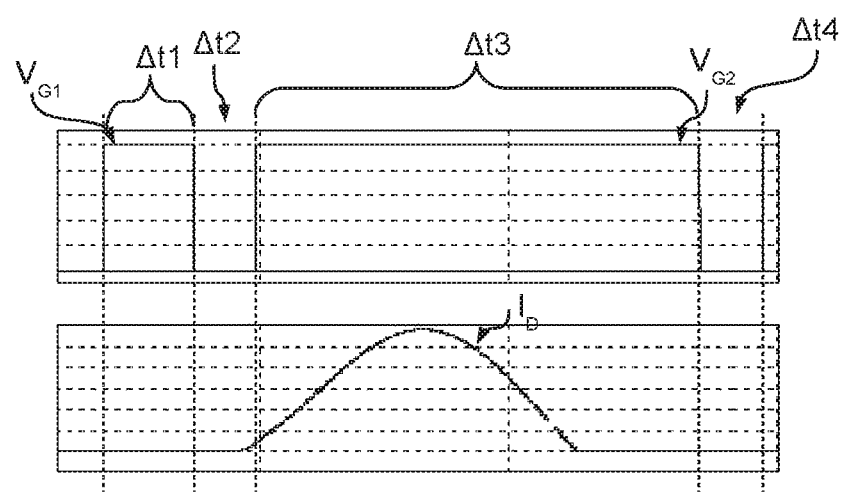

In this regard, FIGS. 5A and 5B show the driving signal $V_{G2}$ for switch $S_2$ and current $I_D$ flowing through the diode respectively for $C_{RS}=C_{RS1}$ (FIG. 5A) and $C_{RS}=C_{RS1}+C_{RS2}$ (FIG. 5B). Specifically, in FIG. 5A, switch $S_2$ is opened when current $I_D$ flowing through the diode is not zero.

Figure 6:
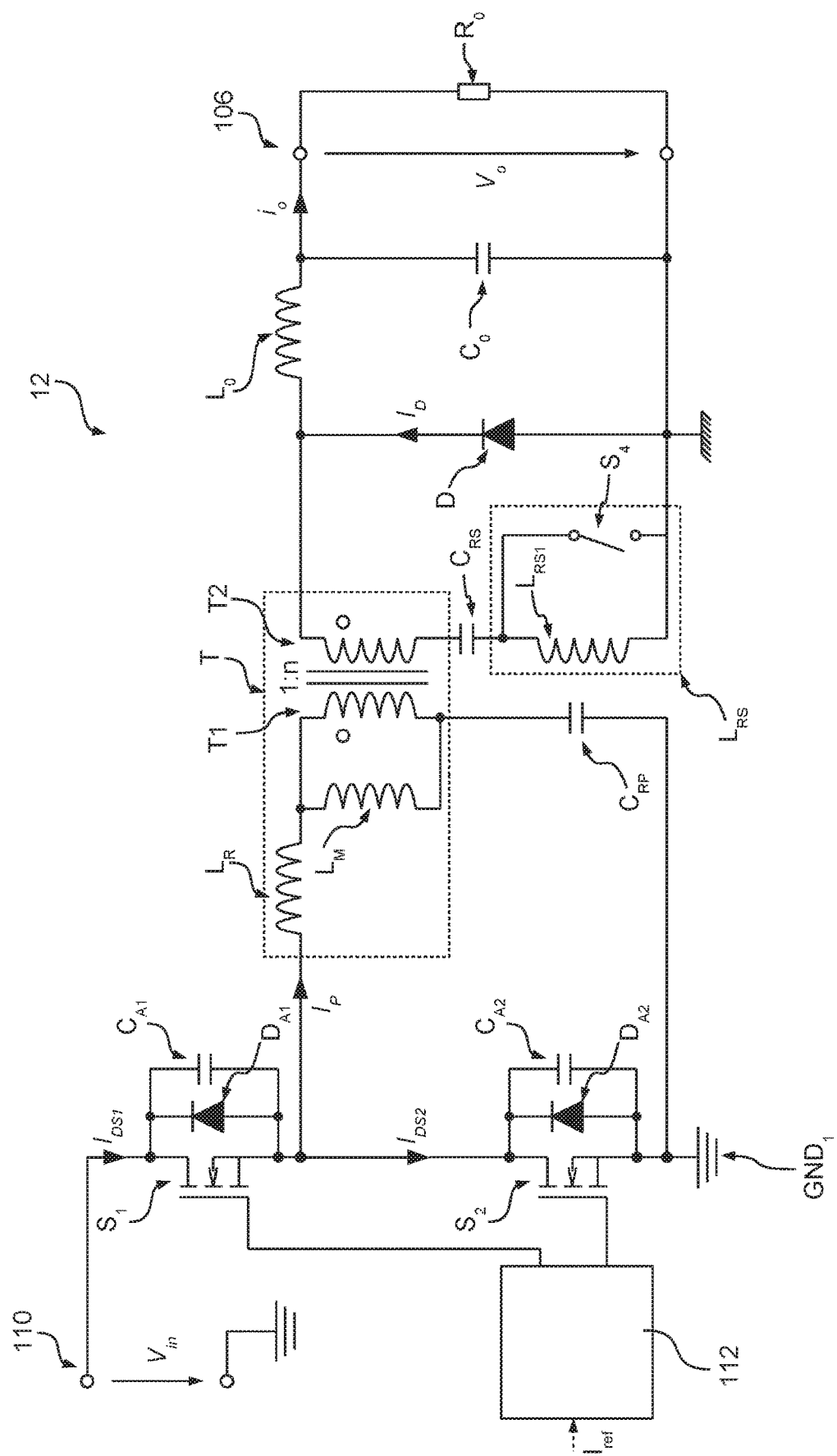
FIG. 6 shows a second embodiment of an electronic converter adapted to adjust its resonant components.

FIG. 6 shows a complementary embodiment, wherein the variation regards the inductance of the resonant circuit. For example, in the presently considered embodiment, an inductor $L_{RS}$ with variable inductance is connected in series with primary winding T1 and/or secondary winding T2. For example, in the presently considered embodiment an inductor $L_{RS1}$ is connected in series with capacitor $C_{RS}$, wherein said inductor $L_{RS1}$ may be selectively short-circuited, e.g. via an electronic switch $S_4$, such as an n-channel MOSFET. Therefore, when the output voltage is high, switch $S_4$ is closed, and when the output voltage is low, switch $S_4$ is opened.

The solutions described in the foregoing enable therefore varying the resonance of electronic converter 12 so that, even at low output voltages, the switching of switches $S_1/S_2$ may take place at zero voltage (ZVS) and switch $S_2$ is opened when the current flowing through diode D amounts to zero (ZCS).

Therefore, by correctly sizing capacitors $C_{RS1}$ and $C_{RS2}$ (or inductor $L_{RS1}$), converter 12 may be used for a wider output voltage/current range. Generally speaking, it might also be possible to employ a higher number of selectively activatable capacitors of inductors, or in general a capacitor $C_{RS}$ or inductor $L_{RS}$ having variable capacitance/inductance. The solutions described with reference to FIGS. 4 and 6 may also be combined.

However, in the previously described solutions, it is necessary to employ an additional electronic power switch ($S_3$ and/or $S_4$) as well as a control unit (e.g. unit 112) which detects the operating condition of converter 12, and varies the value of capacitance $C_{RS}$ and/or of inductance $L_{RS}$ as a function of the detected condition.

Figure 7:
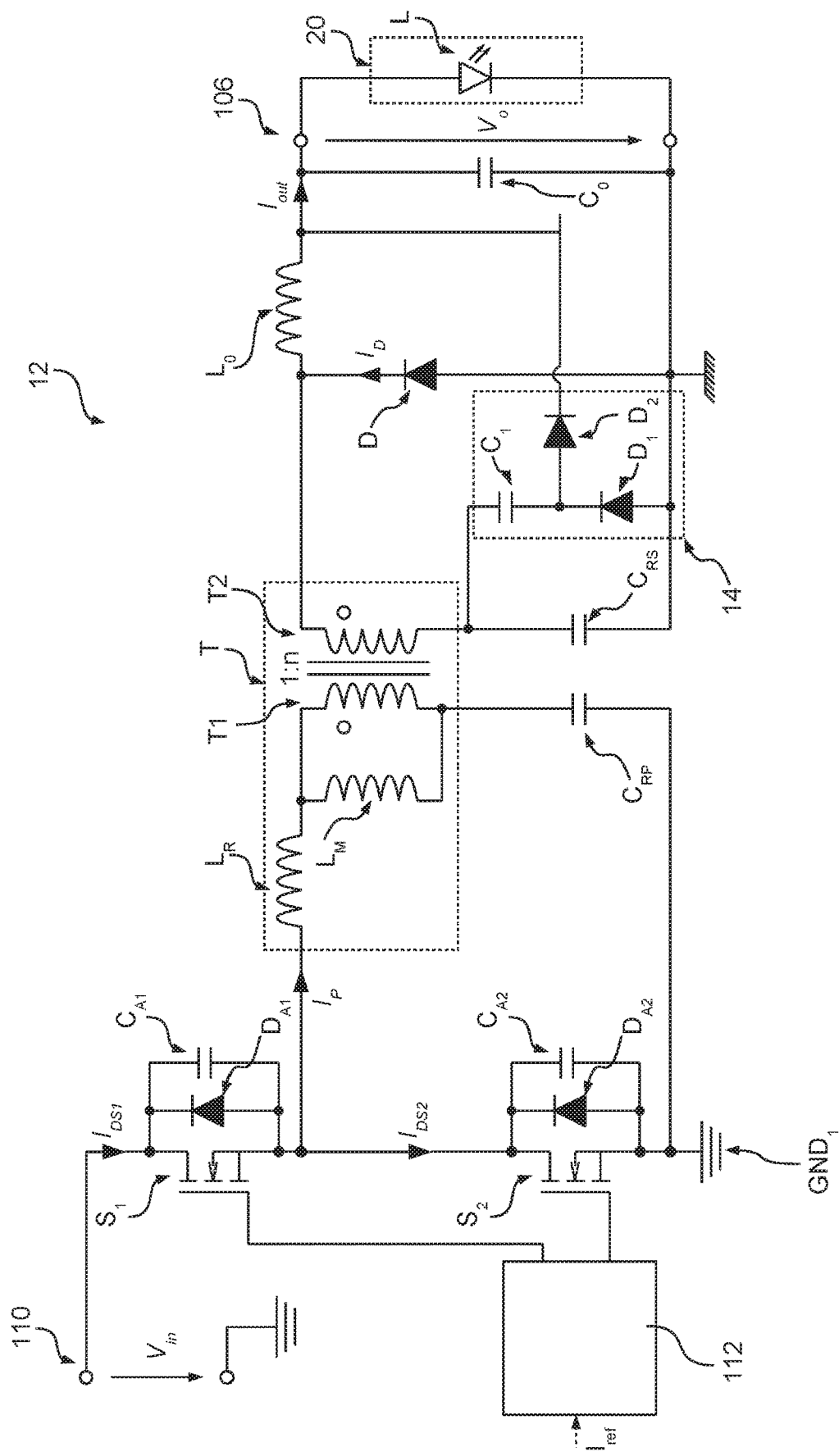
FIG. 7 shows a third embodiment of an electronic converter adapted to adjust its resonant components without active switches.

On the other hand, FIG. 7 shows an embodiment which is adapted to adjust the resonance period of converter 12 automatically.

Specifically, in the presently considered embodiment, converter 12 is based once again on the circuit diagram shown in FIG. 3, and comprises an additional block 14 which substantially implements a charge pump.

Specifically, this charge pump comprises a capacitor $C_1$ and two diodes $D_1$ and $D_2$.

In detail, in the presently considered embodiment, a first terminal of capacitor $C_1$ is connected (e.g. directly) with a first terminal of capacitor $C_{RS}$ (i.e. the intermediate point between capacitor $C_{RS}$ and secondary winding T2), the second terminal of capacitor $C_1$ is connected (e.g. directly) with the cathode of diode $D_1$ and the anode of diode $D_1$ is connected (e.g. directly) to the second terminal of capacitor $C_{RS}$ (i.e. ground $GND_2$). Finally, the anode of diode $D_2$ is connected (e.g. directly) to the cathode of diode $D_1$ (i.e. the intermediate point between capacitor $C_1$ and diode $D_1$) and the cathode of diode $D_2$ is connected with the positive output terminal, e.g. with the intermediate point between inductor $L_o$ and capacitor $C_o$.

Therefore, in the presently considered embodiment, diode $D_1$ is closed (and capacitor $C_1$ is discharged) if the voltage across capacitor $C_1$ exceeds the voltage across capacitor $C_{RS}$ (while neglecting the voltage drop at diode $D_1$). On the other hand, diode $D_2$ is closed (and capacitor $C_1$ is charged) if the voltage across capacitor $C_{RS}$ exceeds the sum of the voltage across capacitor $C_1$ and the output voltage $V_o$, or the voltage across capacitor $C_o$ (while neglecting the voltage drop at diode $D_1$).

In this case, too, control unit 112 is configured for driving switches $S_1$ and $S_2$ of the half-bridge with the following phases, which are repeated periodically:

during a first time interval Δt1 switch $S_1$ is closed and switch $S_2$ is opened;

during a second time interval Δt2 switch $S_1$ is opened and switch $S_2$ is opened;

during a third time interval Δt3 switch $S_1$ is opened and switch $S_2$ is closed;

during a fourth time interval Δt4 switch $S_1$ is opened and switch $S_2$ is opened.

Figure 8:
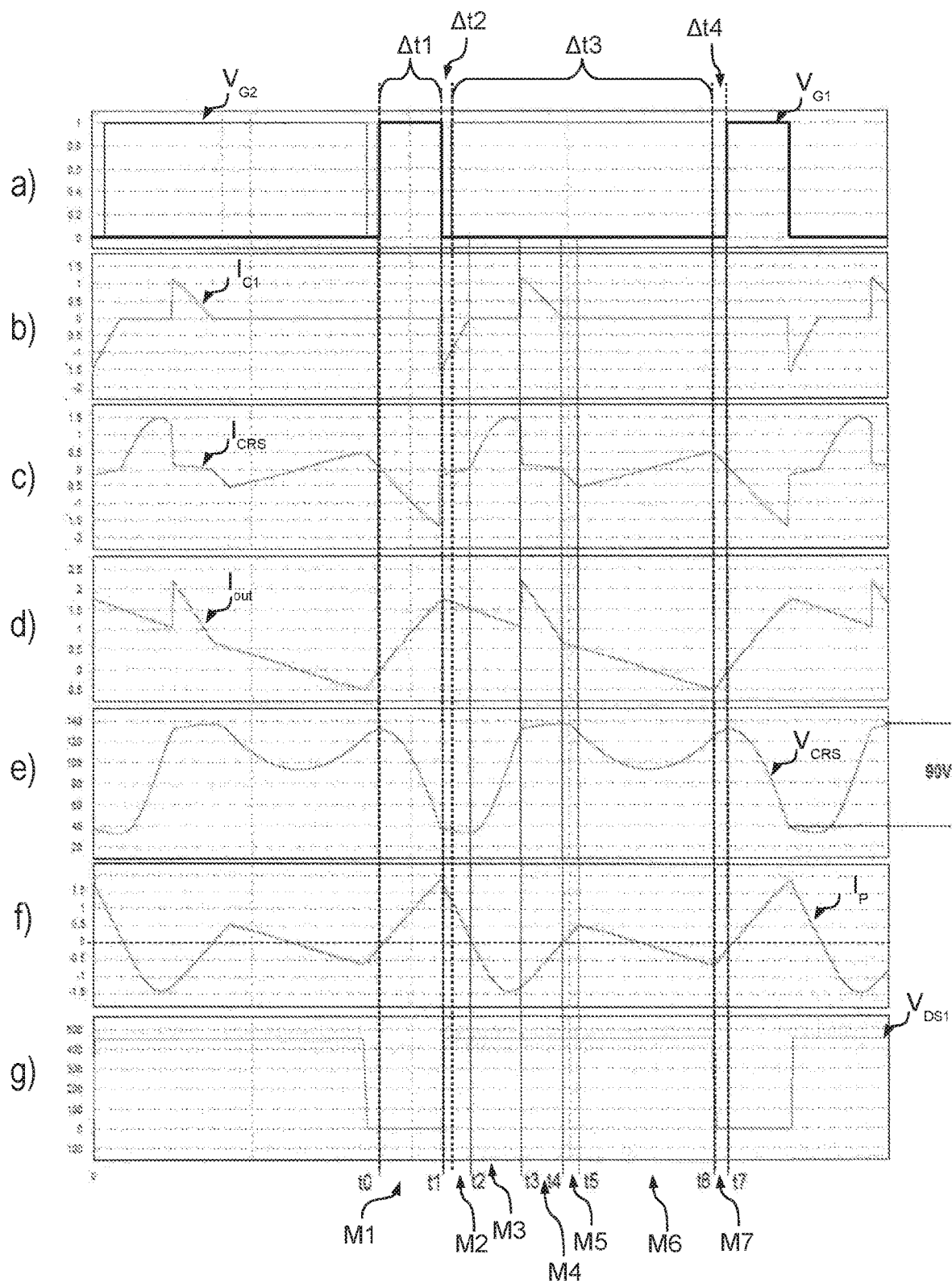
FIGS. 8 to 10 show details of the operation of the converter in FIG. 7.

In this regard, FIG. 8 shows the waveforms of some signals during these driving phases for a low output voltage. Specifically, FIGS. 8a-8g respectively show:

a) driving signal $V_{G1}$ for switch $S_1$ and driving signal $V_{G2}$ for switch $S_2$,
b) current $I_{C1}$ flowing through capacitor $C_1$,
c) current $I_{CRS}$ flowing through capacitor $C_{RS}$,
d) current $I_{out}$ supplied to capacitor $C_o$ and the load (e.g. the LED lighting module 20), i.e. $I_{out}=i_o+I_{Co}$,
e) voltage VCRs across capacitor $C_{RS}$,
f) current $I_P$ flowing through primary winding T1 of transformer T, and
g) voltage $V_{CDS1}$ across switch $S_1$ (specifically between drain and source).

Specifically, in the presently considered embodiment it is assumed for simplicity that secondary winding T2 has the same number of turns as primary winding (i.e. n=1). However, this operating mode also applies to other ratios, by replacing the parameters with equivalent ones, from the primary or the secondary side.

Moreover, capacitor $C_{RP}$ is assumed to have a capacitance which is higher than the capacitance of capacitor $C_{RS}$ (preferably much higher, i.e. $C_{RP} \gg C_{RS}$). Preferably, also capacitor $C_1$ has a capacitance which is higher than the capacitance of capacitor $C_{RS}$ (preferably much higher, i.e. $C_1 \gg C_{RS}$). For example, in various embodiments capacitors $C_{RP}$ and $C_1$ substantially have the same capacitance. Finally, in various embodiments, magnetising inductance $L_M$ is higher than the inductance of inductor $L_o$ (i.e. $L_M > L_o$). For example, in various embodiments, magnetising inductance $L_M$ is 200 uH (microhenry) to 10 mH (millihenry). On the contrary, the inductance of inductor $L_o$ may be 10 uH to 2 mH.

At a time t0, switch $S_1$ is closed and switch $S_2$ stays opened. Specifically, in the presently considered embodiment, switch $S_1$ is closed at zero voltage at time t0 (see FIG. 8g).

Figure 9A:
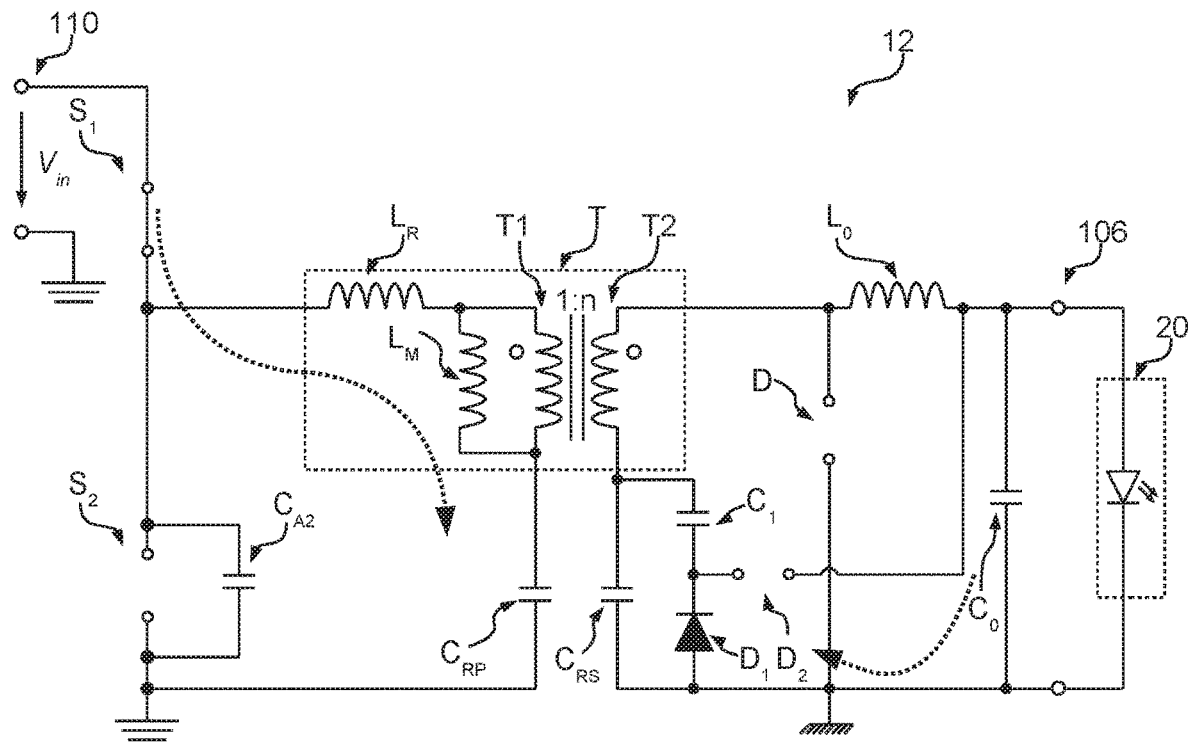

During this operating phase (M1), only diodes $D_{A1}$, $D_{A2}$, $D_2$ and D are opened. The corresponding equivalent circuit diagram of this driving phase is shown in FIG. 9A.

Therefore, current $I_P$ flowing through primary winding T1 of transformer T increases substantially linearly (see FIG. 8f) and a corresponding current flows through secondary winding T2, which discharges capacitor $C_{RS}$ (see FIGS. 8c and 8e).

Generally speaking, when the variation of voltage $V_{CRS}$ to capacitor $C_{RS}$ reaches the value of output voltage $V_o$, capacitor C1 is discharged, too, i.e. diode $D_1$ is closed. Specifically, diode $D_1$ is typically opened at time t0 and is closed when the voltage at capacitor $C_{SR}$ falls below the voltage at capacitor $C_1$, which is supposed to be $V_o$. For example, in the presently considered embodiment, such a value amounts to 90V.

For example, this is visible in FIGS. 8b and 8c around time t1, because current $I_{C1}$ flowing through capacitor $C_1$ rapidly becomes negative, i.e. capacitor $C_1$ is conducting, and the width of current $I_{CRS}$ flowing through capacitor $C_{RS}$ decreases as the latter discharges.

At a time t1 switch $S_1$ is opened. For example, control unit 112 may open switch $S_1$ when output voltage $V_o$ or preferably output current $i_o$ reaches a maximum value, or it may vary the duration of interval Δt1 so that the output voltage or preferably the output current corresponds to a desired average value.

Figure 9B:
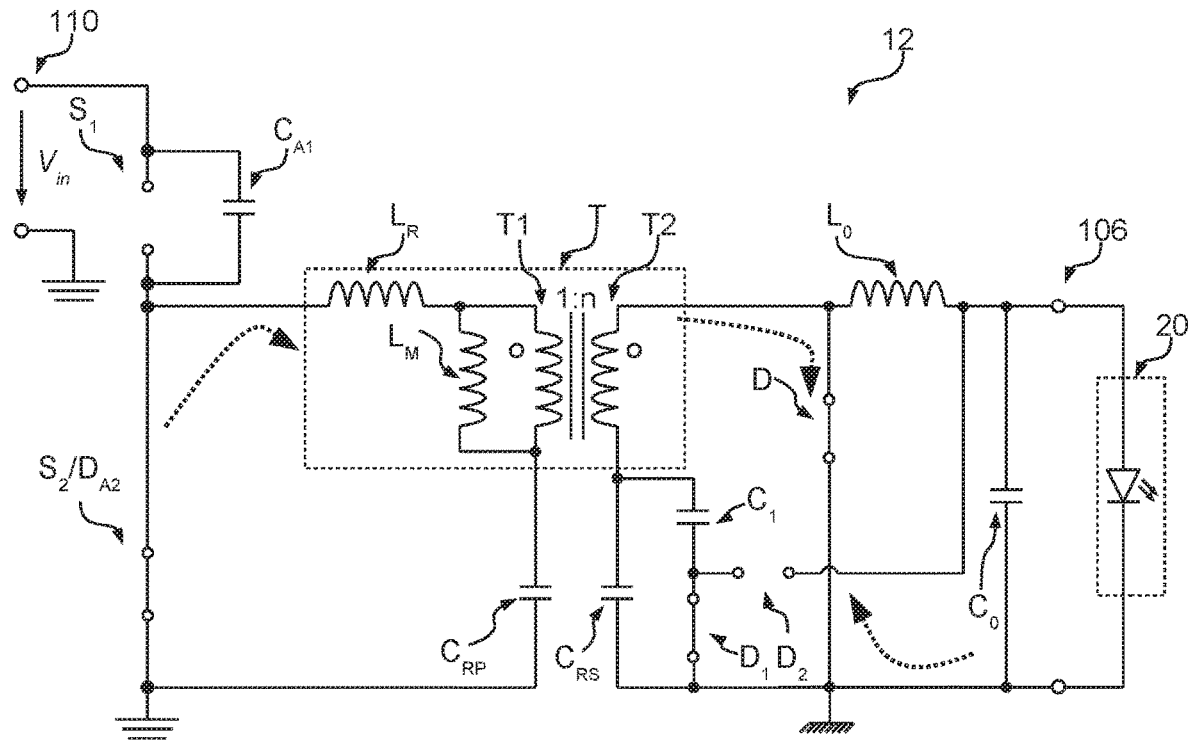

During this operating phase (M2) diode D is closed, because the voltage across secondary winding T2 is reversed. The corresponding equivalent circuit diagram of this driving phase is shown in FIG. 9B.

Specifically, during this phase, current $I_P$ flowing through primary winding T1 is always positive, which discharges capacitor $C_{A2}$ until diode $D_{A1}$ starts operating. Therefore, after a short interval, diode $D_{A1}$ is closed.

A corresponding current also flows through secondary winding T2, which keeps on discharging capacitors $C_{RS}$ and $C_1$ (see FIGS. 8b and 8c). Specifically, such a current oscillates with a resonance period $T_{res1}$ which may be approximated as:

$$T_{res1}=2\cdot\pi\cdot\sqrt{L_{R,sec}\cdot(C_{RS}+C_1)} \qquad (1)$$

wherein $L_{R,sec}$ corresponds to the leakage inductance seen from the secondary side.

Subsequently (i.e. at the end of interval Δt2), switch $S_2$ is closed (at zero voltage, because capacitor $C_{A2}$ has been discharged). Therefore, the circuit keeps on operating as before, the only difference being that on the primary side the circuit is now closed via switch $S_2$ and not diode $D_{A2}$. Therefore, FIG. 9B also applies to this phase.

Figure 9C:
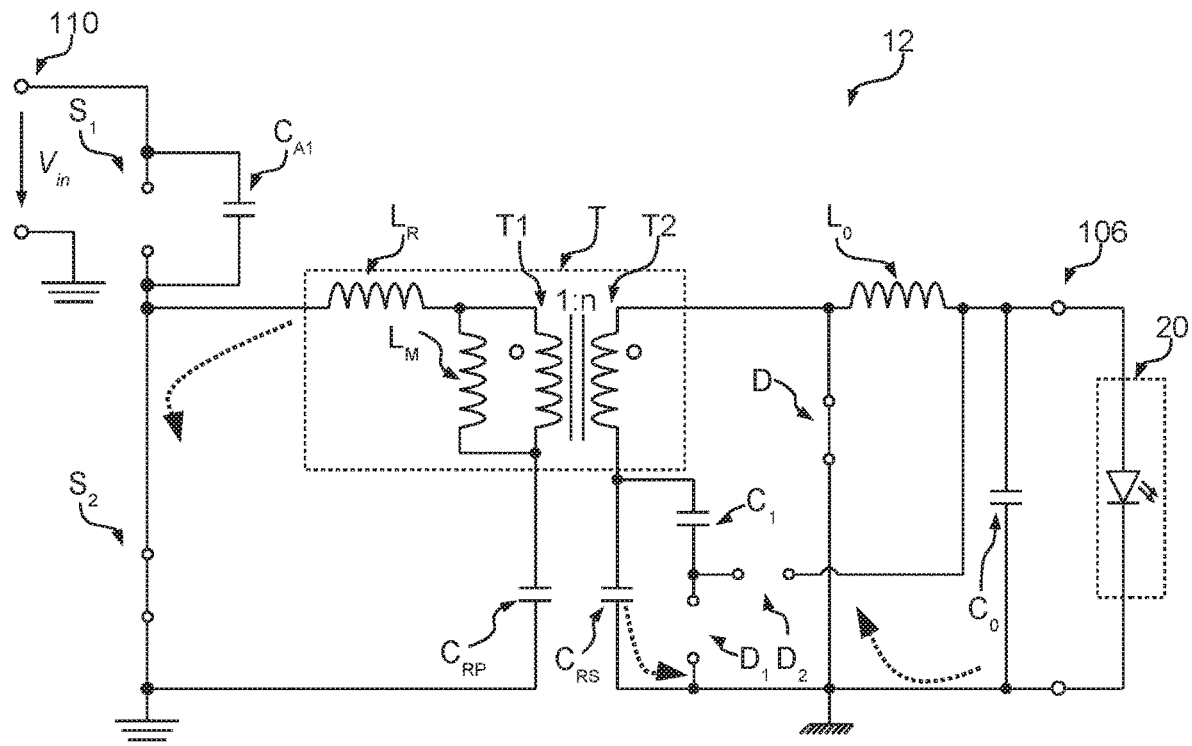

As a consequence, at a time t2 current $I_P$ flowing through primary winding T1 becomes negative (see FIG. 8f). From this moment on, diode $D_1$ reverses its polarity and is opened, i.e. only capacitor $C_{RS}$ is charged (see FIGS. 8b and 8c). The corresponding equivalent circuit diagram of such driving phase (M3) is shown in FIG. 9C.

Therefore, during this phase the current oscillation exhibits a shorter period, approximately corresponding to $T_{res2}$.

$$T_{res2}=2\cdot\pi\sqrt{L_{R,sec}\cdot C_{RS}} \qquad (2)$$

Figure 9D:
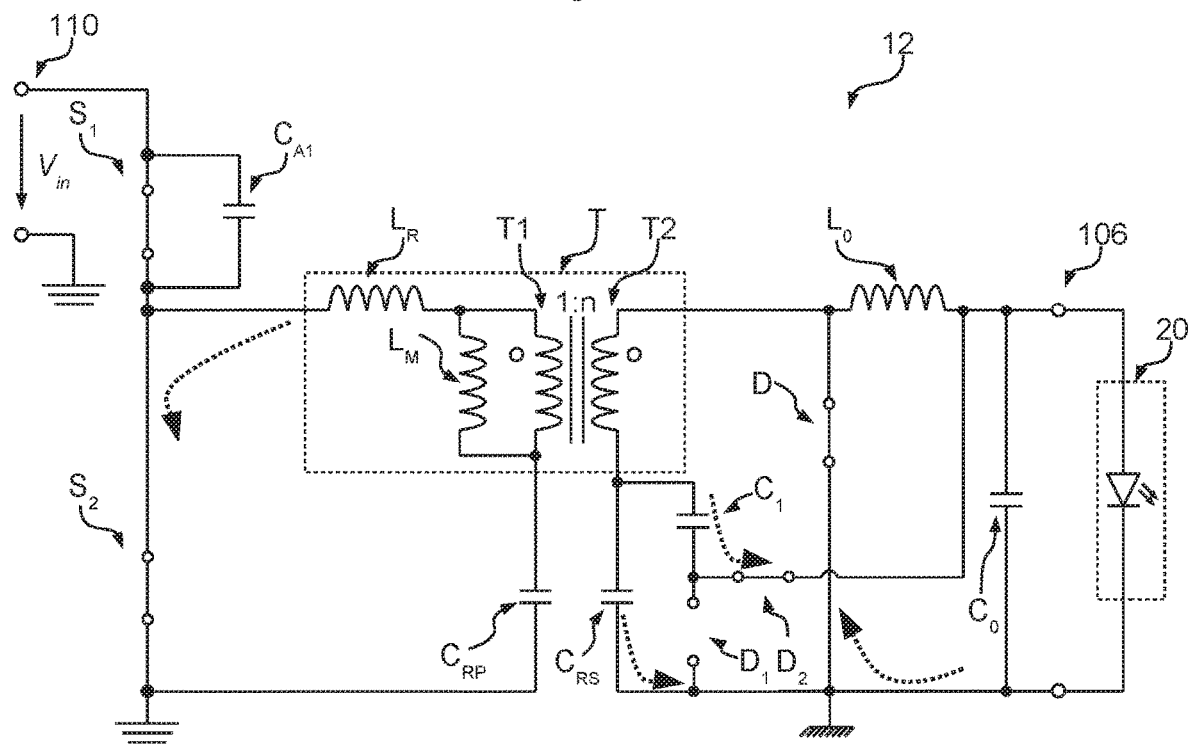

As previously mentioned, during phase M3 only capacitor $C_{RS}$ is charged (see FIG. 8e). As a consequence, at a time t3, voltage $V_{CRS}$ across capacitor $C_{RS}$ reaches a threshold, whereat diode $D_2$ is activated, i.e. from time t3 onwards also capacitor $C_1$ is charged. Such current flowing through diode $D_2$ is also visible in FIG. 8d, wherein current $I_{out}$ includes a peak during phase M4. The corresponding equivalent circuit diagram of this driving phase (M4) is shown in FIG. 9D.

Specifically, in this phase, the current oscillation once again features the period $T_{res1}$ and capacitors C1 and $C_{RS}$ are charged until, at a time t4, the variation of voltage $V_{CRS}$ across capacitor $C_{RS}$ reaches output voltage $V_o$ (e.g. 90 V for the presently considered embodiment), and consequently also current $I_p$ reaches zero.

Figure 9E:
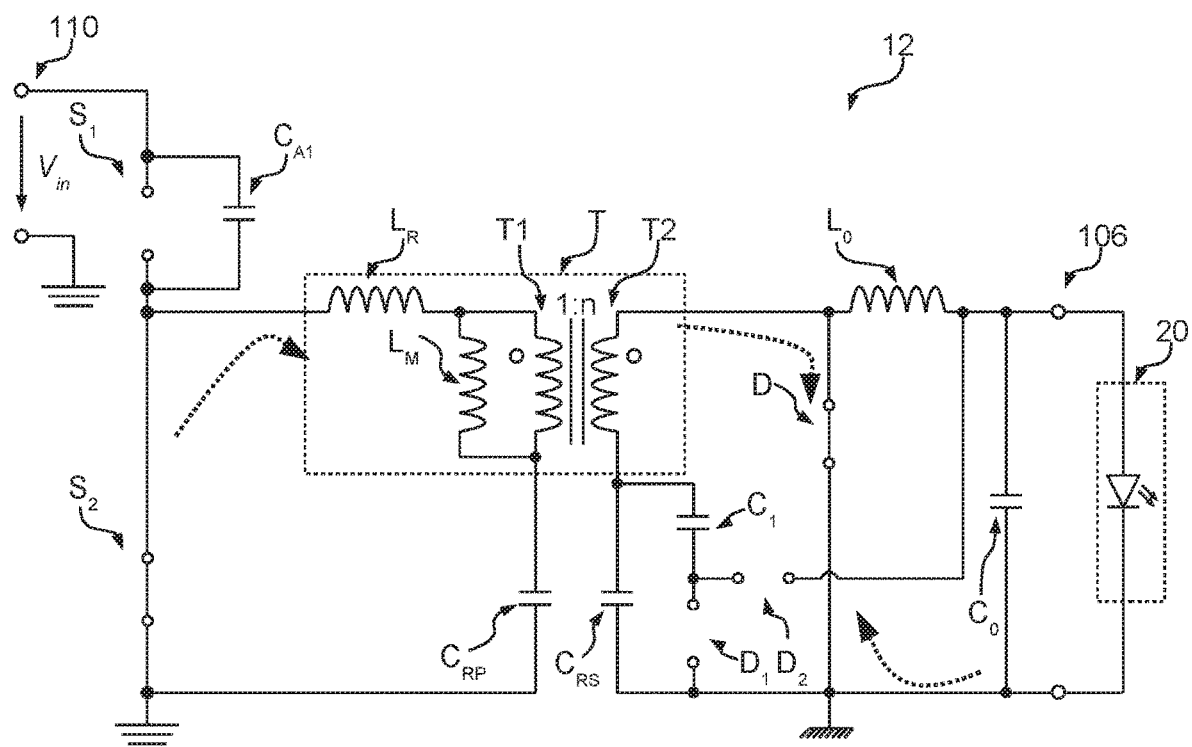

Therefore, in the subsequent phase (M5), diode $D_2$ is opened and the current oscillates again with a period $T_{res2}$. The corresponding equivalent circuit diagram of this driving phase (M5) is shown in FIG. 9E.

Specifically, during this operating phase, current $I_p$ is positive again, and capacitor $C_{RS}$ is therefore discharged (see FIG. 8c).

Generally speaking, in parallel with phases M2, M3, M4 and M5, inductor $L_o$ generates a flow of current towards output 106, which is closed through diode D.

However, during phase M5, the flow of current $I_{CRS}$ discharging capacitor $C_{RS}$ is also closed through diode D, but it runs in the opposite direction through diode D.

Figure 9F:
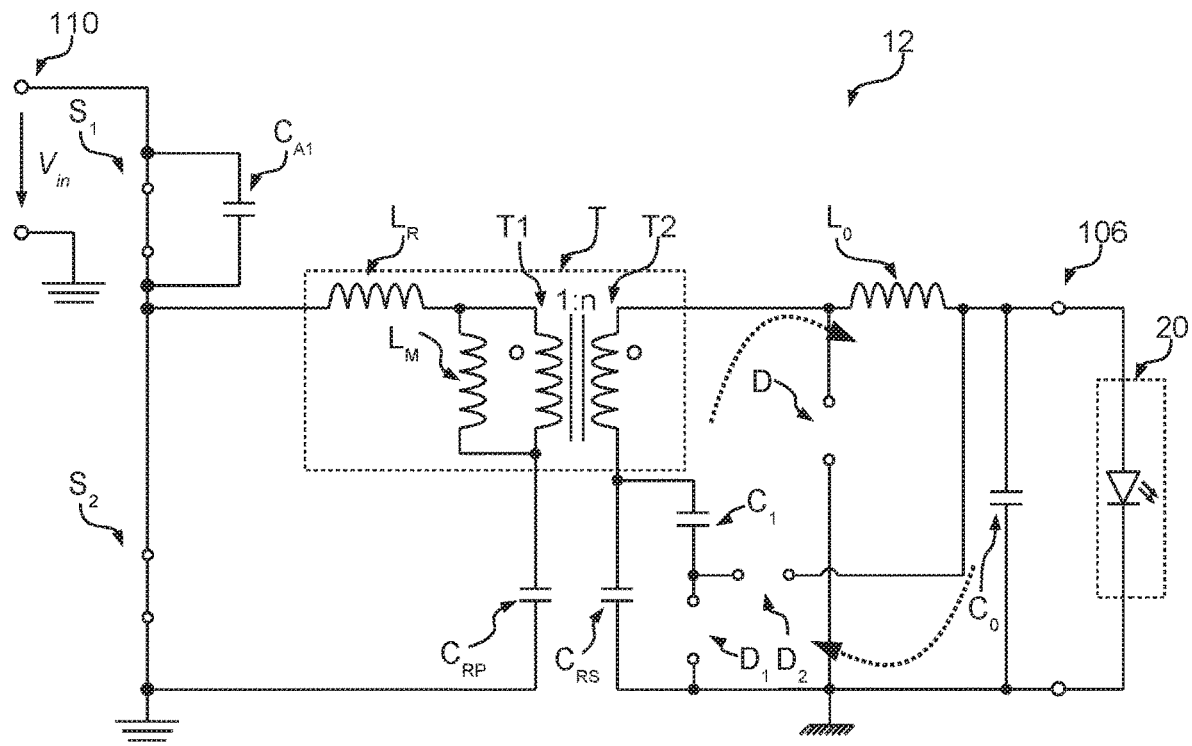

Therefore, at a time t5, current $I_{CRS}$ discharging capacitor $C_{RS}$ corresponds to current $I_{Lo}$ supplied by inductor $L_o$, and diode D is opened. The corresponding equivalent circuit diagram of this driving phase (M6) is shown in FIG. 9F.

Consequently, from this moment (t5) onwards, components $L_o$ and $C_o$ are connected in series with secondary winding T2 and capacitor $C_{RS}$, and magnetising inductance $L_M$ of the transformer is charged.

In the presently considered embodiment, the duration of interval Δt3 is chosen so that, at the end of period Δt3, current $I_P$ flowing through primary winding is negative, or a current is supplied which flows through switch $S_2$ towards ground $GND_1$. For example, this condition may be detected via a measure of the current flowing through switch $S_2$, or by determining the duration via a calculation or empirically for the specific operating condition of converter 12.

As a consequence, at a time t6, switch $S_2$ is opened and current $I_P$ flowing through the primary winding is used to charge capacitor $C_{A2}$, thereby establishing the condition for zero voltage switching of switch S1 at a subsequent time t7 (corresponding to time t0); then the cycle is repeated.

Figure 9G:
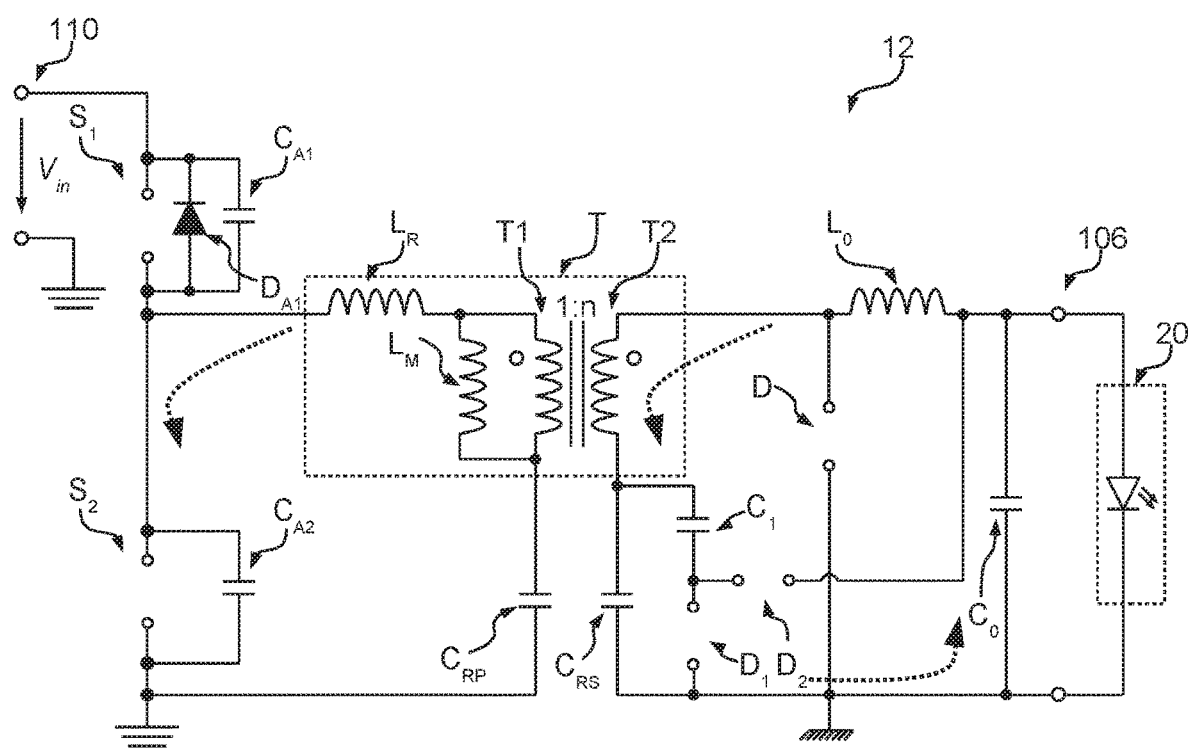

The corresponding equivalent circuit diagram of this driving phase (M7) is shown in FIG. 9G.

Specifically, in this phase, when the voltage at the intermediate point of the half-bridge reaches voltage $V_{in}$, diode $D_{A1}$ may start operating; in other words, from this moment capacitor $C_{A2}$ is no longer charged, while keeping in this way the ZVS condition for switch $S_1$.

Substantially, in the presently considered embodiment, capacitor $C_1$ is connected into the circuit (via diode $D_1$ and diode $D_2$), when the variation of voltage $V_{CRS}$ at capacitor $C_{RS}$ reaches output voltage $V_o$ (a little earlier than time t1 and at time t3).

Therefore, at higher output voltages $V_o$, capacitor $C_{RS}$ may store more energy, or the duration between times t3 and t4 during which capacitor $C_1$ is charged (mode M4) decreases. Moreover, if the variation is lower than output voltage $V_o$, capacitor $C_1$ is not activated.

Figure 10:
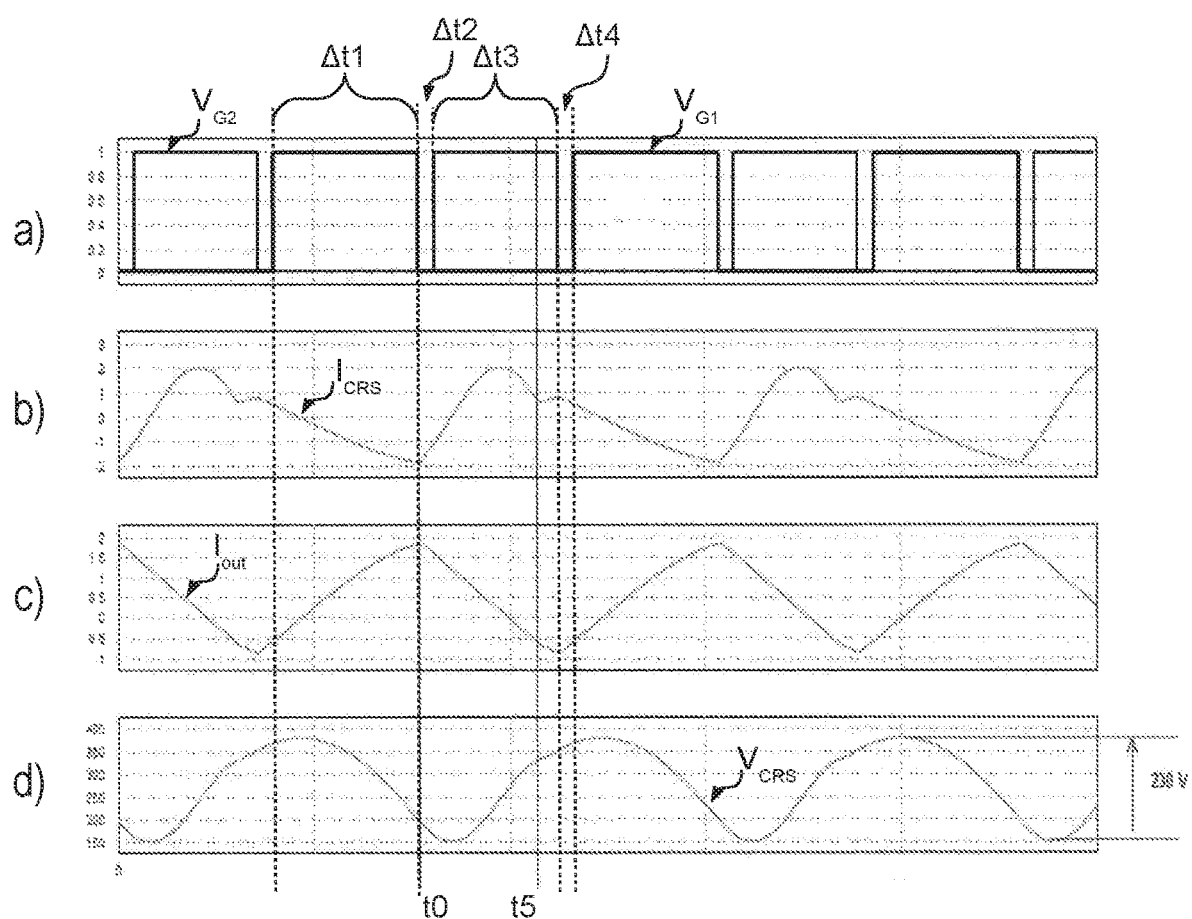

In this regard, for example, FIG. 10 shows the waveforms of some signals of the same circuit for a higher output voltage. Specifically, FIGS. 10a-10d respectively show:
a) driving signal $V_{G1}$ for switch $S_1$ and driving signal $V_{G2}$ for switch $S_2$,
b) current $I_{C1}$ flowing through capacitor $C_1$,
c) current $I_{out}$ which is supplied to capacitor $C_o$ and to the load (e.g. LED lighting module 20), i.e. $I_{out}=i_o+I_{Co}$, and
d) voltage $V_{CRS}$ across capacitor $C_{RS}$.

Specifically, in the presently considered embodiment, voltage $V_{CRS}$ across capacitor $C_{RS}$ has a maximum variation of 230V and stays below output voltage $V_o$. Therefore, in this embodiment, capacitor $C_1$ is not used and diodes $D_1$ and $D_2$ stay opened.

As a consequence, in the previously considered embodiments, the circuit adjusts automatically to the value of output voltage $V_o$ by varying the duration of the interval (t3-t4) during which capacitor $C_1$ is connected into the resonant circuit, i.e. the duration of mode M4, which enables to extend the duration of time interval Δt3 until current $I_P$ flowing through primary winding T1 becomes negative.

Of course, without prejudice to the principle of the invention, the details and the embodiments may vary, even appreciably, with respect to what has been described herein by way of non-limiting example only, without departing from the extent of protection of the invention as defined by the annexed claims.

While the invention has been particularly shown and described with reference to specific embodiments, it should be understood by those skilled in the art that various changed in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An electronic half-bridge converter, the electronic half-bridge converter comprising:
   an input comprising two terminals for receiving a first power signal;
   an output comprising two terminals for providing a second power signal;
   a half-bridge comprising a first and a second electronic switch connected in series between the two input terminals;
   a transformer comprising a primary winding and a secondary winding,
   a first capacitor, wherein the first capacitor and the primary winding are connected in series between an intermediate point between the first and the second electronic switch and at least one of the two input terminals;
   wherein there are at least three branches connected in parallel on a side of the secondary winding comprising:
   a first branch comprising a diode,
   a second branch comprising a second capacitor, wherein the second capacitor and the secondary winding are connected in series between the cathode and the anode of the diode; and
   a third branch comprising an inductor, wherein the inductor and the output are connected in series between the cathode and the anode of the diode;
   wherein the electronic half-bridge converter further comprises:
   a third capacitor;
   a second diode connected between the third capacitor and the second capacitor, wherein the electronic half-bridge converter is configured to close the second diode when the voltage at the third capacitor exceeds the voltage at the second capacitor;
   a third diode connected between the third capacitor and the output, wherein the electronic half-bridge converter is configured to close the third diode when the voltage at the second capacitor exceeds the sum of the voltage at the third capacitor and the voltage at the output.

2. The electronic half-bridge converter according to claim 1, comprising a fourth capacitor connected in parallel with the output.

3. The electronic half-bridge converter according to claim 1, comprising a control unit configured for driving the first and the second electronic switch with the following time intervals which are repeated periodically:
   a first time interval, wherein the first electronic switch is closed and the second electronic switch is opened;
   a following second time interval, wherein the first electronic switch is opened and the second electronic switch is opened;
   a following third time interval, wherein the first electronic switch is opened and the second electronic switch is closed; and
   a following fourth time interval, wherein the first electronic switch is opened and the second electronic switch is opened.

4. The electronic half-bridge converter according to claim 1, comprising a control unit configured for:
   detecting the current provided through the output of the electronic half-bridge converter; and
   driving the first and/or the second electronic switch as a function of the detected current.

5. The electronic half-bridge converter according to claim 4, wherein at least one LED is connected to the output of the electronic half-bridge converter.

6. A method of operating an electronic converter according to claim 1, comprising:
  driving the first and the second electronic switch with the following time intervals which are repeated periodically:
    a first time interval, wherein the first electronic switch is closed and the second electronic switch is opened;
    a following second time interval, wherein the first electronic switch is opened and the second electronic switch is opened;
    a following third time interval, wherein the first electronic switch is opened and the second electronic switch is closed; and
    a following fourth time interval, wherein the first electronic switch is opened and the second electronic switch is opened.

* * * * *